W. C. BENSON.
PITMAN CONNECTION.
APPLICATION FILED MAR. 25, 1908.
912,277.
Patented Feb. 16, 1909.
2 SHEETS—SHEET 1.
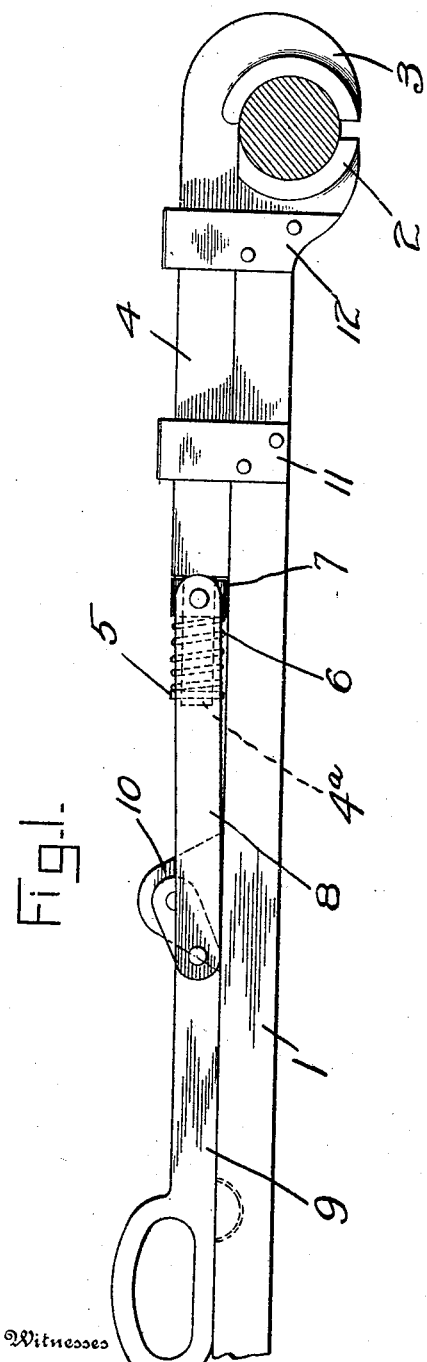
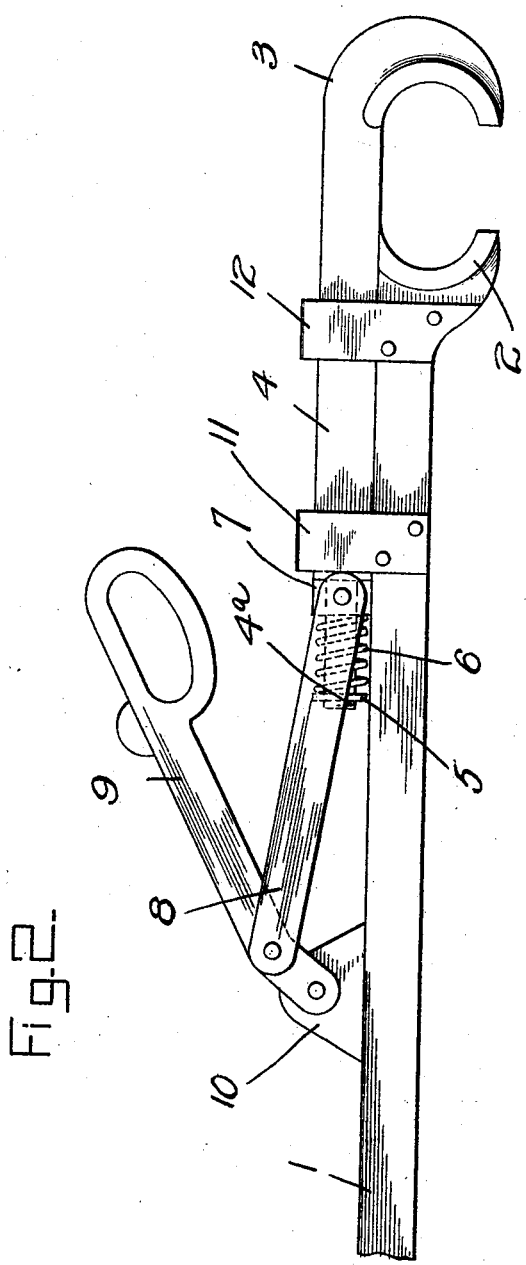
Inventor
W.C. Benson,
By D. Swift &C.
Attorneys

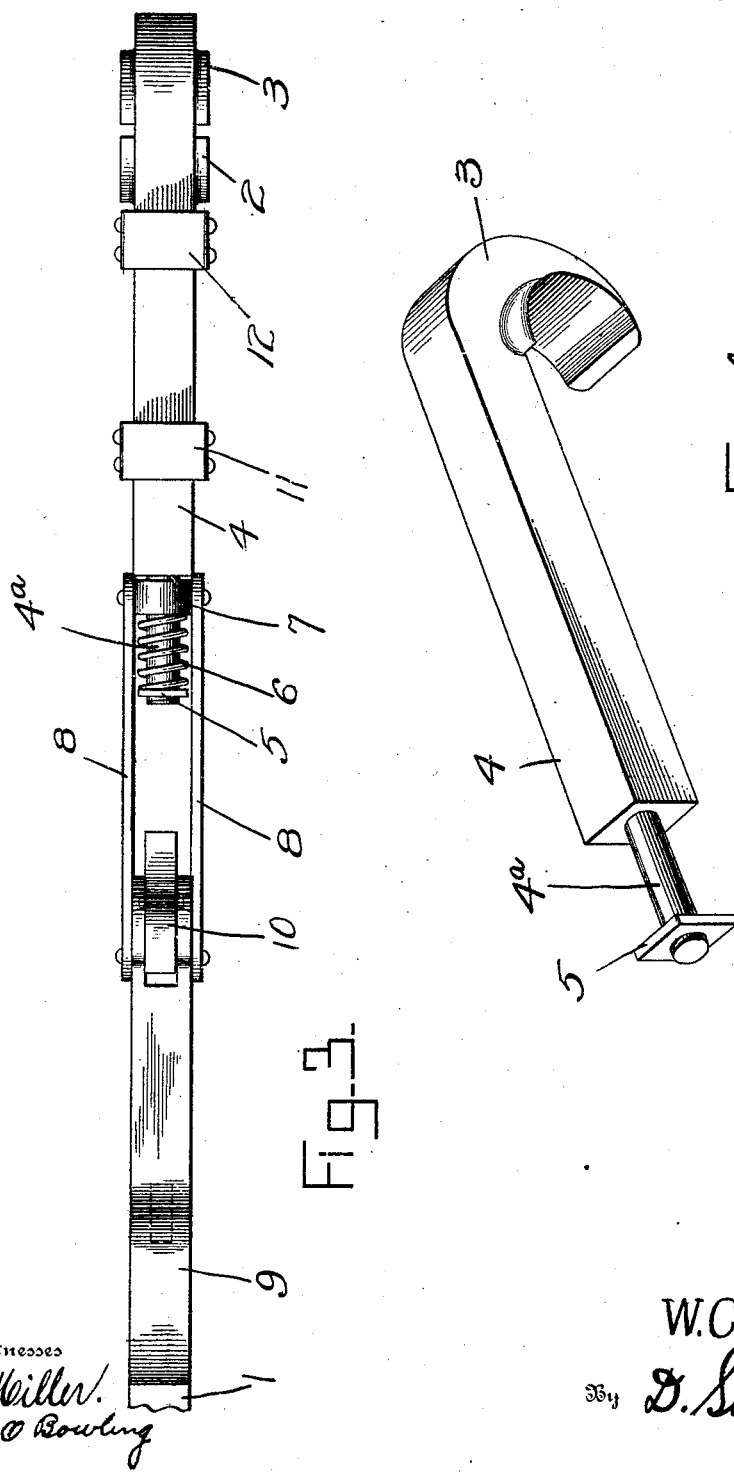

UNITED STATES PATENT OFFICE.

WILLIAM C. BENSON, OF MOUNTS, INDIANA.

PITMAN CONNECTION.

No. 912,277.   Specification of Letters Patent.   Patented Feb. 16, 1909.

Application filed March 25, 1908. Serial No. 423,107.

*To all whom it may concern:*

Be it known that I, WILLIAM C. BENSON, a citizen of the United States, residing at Mounts, in the county of Gibson and State of Indiana, have invented a new and useful Pitman Connection; and I do hereby declare the following to be a full, clear, and exact description of the invention, such as will enable others skilled in the art to which it appertains to make and use the same.

The invention relates to a pitman connection and has for its object to provide a simple, inexpensive and durable device of this character adapted to be used for connecting a pitman with the object desired and which can be readily attached or detached as desired.

With these and other objects in view, the invention consists in the novel construction and arrangement of parts hereinafter shown and described and particularly pointed out by the appended claim.

In the drawings Figure 1 is a side elevation of my pitman connection showing the same applied, the connection being in engaged position. Fig. 2 is a similar view to Fig. 1 showing the device in a disengaged or unlocked position. Fig. 3 is a plan view of the device. Fig. 4 is a detail perspective view of the movable jaw.

Referring to the drawings 1 designates a pitman or shank on one end of which is provided a jaw 2 which coöperates with a movable jaw 3 which is also provided with a shank 4. The shank 4 is provided with a stationary lug 5 against which presses one end of a spring 6 which spring surrounds a reduced portion 4$^a$ of the shank 4 and the other end presses against a slidable collar 7. The inner end 4$^a$ of the shank 4 is connected with a link 8, which link also pivotally connects with a toggle lever 9. The toggle lever is pivotally connected with a projection 10 which is formed integral with the shank 1.

It will be seen that when it is desired to unlock the device, the toggle lever is raised, which forces the movable jaw 3 outward, thereby causing the device to be disengaged from the object with which it is connected. It will be seen also that the action of the spring will hold the device in its disengaged position. It will also be seen by reason of the construction of the parts that when the device is engaged the action of the spring will also hold or lock the device in the engaged position, thereby safeguarding the same against accidental release.

It will be seen that the invention is simple, and that it can be readily applied to a crank or other object as desired in a most convenient manner and that the same can be released in an equally simple manner.

The shank 1 is also provided with collars 11 and 12 which hold it in engagement with the shank 4 of the movable jaw, as will be clearly understood.

What is claimed is:—

A device of the character described comprising a fixed bar, collars mounted on said bar, a sliding bar or member mounted in said collars, and having a nut on the inner end, and a jaw opposed to the aforesaid jaw, a post or projection mounted on said fixed bar, a lever pivoted upon said post, a sliding collar arranged upon the sliding bar or member, link members pivoted to said collar and eccentrically to said lever, and a spring mounted on the said movable bar between said link members and adapted to press said sliding collar and nut apart.

In testimony whereof I have signed my name to this specification in the presence of two subscribing witnesses.

WILLIAM C. BENSON.

Witnesses:
LARKIN F. MAUCK,
BYRON M. JOHNSON.